United States Patent
Ogawa et al.

(10) Patent No.: US 6,758,888 B2
(45) Date of Patent: Jul. 6, 2004

(54) EMULSION INK FOR STENCIL PRINTING

(75) Inventors: Hiroyuki Ogawa, Ibaraki-ken (JP);
Sadanao Okuda, Ibaraki-ken (JP);
Hiromichi Yamada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/827,209

(22) Filed: Apr. 6, 2001

(65) Prior Publication Data

US 2001/0037749 A1 Nov. 8, 2001

(30) Foreign Application Priority Data

Apr. 6, 2000 (JP) ........................................ 2000-105129

(51) Int. Cl.$^7$ .............................................. C09D 11/03
(52) U.S. Cl. ................ 106/31.26; 106/31.6; 106/31.65
(58) Field of Search ............................ 106/31.26, 31.6, 106/31.65

(56) References Cited

U.S. PATENT DOCUMENTS

| | | | | |
|---|---|---|---|---|
| 5,718,748 A | * | 2/1998 | Suzuki et al. ............ | 106/31.26 |
| 5,776,232 A | * | 7/1998 | Okuda et al. ............ | 106/31.26 |
| 5,800,599 A | | 9/1998 | Asada ..................... | 106/31.26 |
| 5,948,151 A | * | 9/1999 | Ono et al. ............... | 106/31.26 |
| 6,149,720 A | * | 11/2000 | Asada et al. ............ | 106/31.26 |
| 6,156,109 A | * | 12/2000 | Asada ..................... | 106/31.26 |
| 6,156,258 A | * | 12/2000 | Takada et al. ............ | 264/531 |
| 6,348,519 B1 | * | 2/2002 | Ohshima et al. ......... | 101/128.4 |
| 6,454,843 B2 | * | 9/2002 | Matsuda .................. | 106/31.43 |

FOREIGN PATENT DOCUMENTS

| EP | 0 704 506 A1 | 4/1996 |
|---|---|---|
| EP | 0 795 590 A2 | 9/1997 |
| JP | 7-179799 | 7/1995 |
| JP | 9-328645 | 12/1997 |
| JP | 2000-34434 A | 2/2000 |

* cited by examiner

Primary Examiner—Mark L. Bell
Assistant Examiner—Veronica F. Faison
(74) Attorney, Agent, or Firm—Fitch, Even, Tabin & Flannery

(57) ABSTRACT

A water-in-oil (W/O) emulsion ink for stencil printing is provided which is prevented from pigment aggregation and thus excellent in ink fixability, high in printing density and less declining in printing density even after printing many sheets. The emulsion ink has a ratio by volume of the water phase to liquid components of the oil phase (i.e., volume of water phase/volume of the liquid components of oil phase) in a range of 1.0 to 3.5, preferably 1.0 to 3.0 at 23° C. The liquid components of the oil phase may be composed of a resin, a solvent and a surfactant. The oil phase can contain a pigment at a ratio by volume of 0.19 or less to the total volume of the oil phase. The pigment preferably has an average particle size of 0.02 to 1.5 ($\mu$m). The water phase preferably has an average particle size of 0.1 to 1.0 ($\mu$m). The ink is suitable for containing particles of organic pigments with non-uniform shapes and a large average particle size like copper phthalocyanine blue and diaxazine violet.

9 Claims, No Drawings

EMULSION INK FOR STENCIL PRINTING

This invention relates to an emulsion ink for stencil printing, particularly an emulsion ink for stencil printing excellent in ink fixability, high in printing density and less declining in printing density even after printing many sheets.

The heat sensitive stencil printing system recently allows high grade prints to be obtained readily and quickly since the heat sensitive stencil making technique in which a thermal printing head is used as a perforation device with digitized image processing has been adopted. Therefore, the system has been increasingly noticed as convenient information processing terminals.

The stencil printing system has a feature of good and simple operability that requires no skilled operator, compared with offset, gravure and letterpress printing systems. In other words, the stencil printing system is advantageous in that no skill is required for operation and that no special work such as machine washing is required after completion of use. Thus, the stencil printing system does not require any specialist for operation, but is very suitable for printing a relatively small number of sheets.

Furthermore, in the heat sensitive stencil making technique using a thermal printing head, size of perforations in a stencil has been standardized, thereby facilitating control of transfer amount of ink, compared with the conventional stencil making methods in which infrared light or xenon flash was used as a heat energy source. Therefore, the possibility that such problems as set-off and blurring occur due to excessive ink transfer has decreased, and the image grade has improved dramatically.

As described above, the stencil printing system is advantageous in that printing speed is high similarly to the offset, gravure and letterpress printing systems, and also that it is easy to operate and can be installed as an office machine like PPC and ink jet printers. So, the stencil printing system has expanded its use rapidly.

For enhancing the image grade, it is proposed to improve fixability of ink onto paper and achieve a higher density of images by adding an oil-soluble dye or a mixture of an oil-soluble dye and a pigment, as a colorant, to the oil phase of a water-in-oil (W/O) emulsion ink (JP-A-06-9912), to produce a toned ink free from color separation by adding a water-soluble dye to the water phase (JP-A-05-117565), to produce an ink high in image density and good in fixability by adding 5.0 to 12 wt % of a pigment to the ink (JP-A-09-328645), to prevent set-off by letting an emulsion ink contain solid particles or waxes of, for example, a polyamide or polystyrene with an average particle size of 8 to 30 $\mu$m (JP-A-06-116525), to improve fixability on paper and storage stability by keeping an average particle size of pigments dispersed in the oil phase in a range of 0.15 to 0.4 $\mu$m (JP-A-07-179799), and so on.

These proposals are intended to improve the printing grade, but if the pigment content is increased to raise the printing density, it often happens that pigment aggregation occurs in the water-in-oil (W/O) emulsion ink. If this phenomenon occurs, it often happens that the color expected from the corresponding pigment content is not obtained, thereby causing the printing density to decline.

Furthermore, the pigment aggregation in a water-in-oil (W/O) emulsion ink depends upon dispersion state of pigments. Pigments poor in dispersibility such as phthalocyanine pigments including phthalocyanine blue and phthalocyanine green and dioxazine pigments are large in average particle size and contain numerous non-uniform coarse particles. If such pigments are used, the pigment aggregation is apt to occur in the aforementioned water-in-oil (W/O) emulsion ink.

If the pigment aggregation grows to form large lumps, it can happen that perforations of a stencil sheet are clogged. With recent increase in resolution of thermal heads, pigments are required to be still smaller than 30 ($\mu$m) in particle size. It is, therefore, increasingly necessary to prevent the pigment aggregation as far as possible for preventing the clogging of the stencil sheet, while ensuring the ink fixability and keeping the storage stability.

For improving the storage stability, it is proposed to obtain an ink excellent in storage stability and low in temperature dependence by treating a water-in-oil (W/O) emulsion ink at a high shear rate using, for example, stirring blades or rotor stator in the production of the ink (JP-A-06-192606), to achieve the fixability on paper and the storage stability by keeping the particle size of the emulsion of the water phase at 10 $\mu$m or less and the average particle size of the pigment dispersed in the oil phase at 0.4 $\mu$m or less (JP-A-07-179799), and to effectively decrease the rise of ink viscosity during storage at high temperature by keeping the sum of the water phase particles content and the carbon content of a water-in-oil type emulsion ink at 72 wt % or less based on the total weight of the ink (JP-A-09-328645). However, if the particle size of the emulsion is kept too small for making the emulsion stable, it in turn can happen that the pigment aggregation occurs.

On the other hand, for water-in-oil (W/O) emulsion inks for stencil printing, it has been a general practice to keep the ratio of the water phase weight to the oil phase weight high (many proposals are presented, for example, in JP-A-61-255967, JP-A-04-132777, JP-A-04-288375, JP-A-05-93161, JP-A-06-33007, JP-A-06-107998, JP-A-07-150091, JP-A-10-245516, etc.). However, if the weight ratio of the water phase is raised, it can also happen that the pigment aggregation occurs.

In an emulsion containing a pigment in the oil phase, it seems that the pigment aggregation cannot be prevented even in reference to the ratio by weight of water phase/oil phase. In view of this, the object of this invention is to effectively prevent the pigment aggregation in reference to another indicator.

To achieve the above object, the inventors have studied intensively the physical properties of emulsion inks in reference to various indicators, and as a result, have found that if the ratio of the volume of the water phase to the volume of the liquid components of the oil phase (i.e., volume of water phase/volume of liquid component of oil phase) is referred to as an indicator, it is possible to produce an emulsion ink for stencil printing, which is excellent in printing grade such as printing density and fixability but does not cause perforated stencil sheets to be clogged with coarse pigment particles or aggregated pigments even after many sheets have been printed. Thus, this invention has been completed.

This invention provides an emulsion ink for stencil printing, which is a water-in-oil (W/O) emulsion ink having an oil phase and a water phase, characterized in that the ratio by volume of the water phase to the liquid components of the oil phase (namely, volume of water phase/volume of liquid components of oil phase) is in a range of 1.0 to 3.5 at 23° C.

In the water-in-oil (W/O) emulsion ink used for stencil printing, the addition amount of the water phase has been generally set in a higher proportion. The reason is that it contributes to improvements of various properties by way of keeping the viscosity change due to the ink temperature change small, raising the ink penetration rate, enhancing the structural viscosity of the ink, preventing the ink from flowing out of the printing machine, and lowering the spinnability of the ink when the printing drum is separated from a printing medium. Therefore, most of the conventional inks have high water contents.

However, it was found that if the water content is made higher than a certain level in a water-in-oil (W/O) emulsion containing a pigment in the oil phase thereof, the pigment aggregation occurs. In general, the state of the maximum water content corresponds to the closest packing in terms of volume. However, the closest packing includes hexagonal closest packing and cubic closest packing, and it is actually unknown which of the closest packing patterns occurs in each water-in-oil (W/O) emulsion. Furthermore, in the idea of the closest packing, the packed particles, namely the water nuclei in case of a water-in-oil (W/O) emulsion, are assumed to be perfect spheres having the same particle size. So, the optimum water content of a water-in-oil (W/O) emulsion ink cannot be decided in reference to the theoretical value. The inventors made experiments of actual water-in-oil (W/O) emulsion inks using the volume ratio as an indicator, and as a result, found that if the ratio of the volume of the water phase to the volume of the liquid components of the oil phase (i.e., volume of water phase/volume of liquid components of oil phase) is larger than 3.5 at 23° C., the pigment contained in the oil phase aggregates to form coarse particles, and consequently the pigment aggregation causes the decline of color development efficiency, the decline of fixability and the clogging of stencils with aggregated particles. It was also found that if the ratio by volume of the water phase to the liquid components of the oil phase (i.e., volume of water phase/volume of liquid components of oil phase) is lower than 1.0, the ink is not suitable for stencil printing since improvements of temperature adaptability, penetration rate, structural viscosity, flowing-out of the printing machine, and spinnability as mentioned above become small. A preferable range of the ratio by volume of the water phase to the liquid components of the oil phase is 1.0 to 3.0.

In this invention, it is preferable that the average particle size of the water phase is 0.1 to 1.0 ($\mu$m). Since spaces of the continuous oil phase depend on particle size of the water phase, the pigment aggregation depends on the average particle size of the water phase. If the particle size of the water phase is large, the oil phase is not fractionalized, allowing spaces where pigment particles can exist, and thus the pigment aggregation is unlikely to occur. However, if the particle size of the water phase is small, it is considered that the spaces where pigment particles can exist are fractionalized, and pigments with a large average particle size are likely to aggregate. From this point of view, in this invention, it is preferable that the average particle size of the pigment is 0.02 to 1.5 ($\mu$m). Furthermore, if the pigment content in the oil phase is large, the pigment aggregation tends to be liable to occur. So, in this invention, it is preferable that the pigment content is 0.19 or less in terms of a volume ratio to the total volume of the oil phase.

The emulsion ink of this invention preferably comprises about 10 to 50 wt % of an oil phase and about 90 to 50 wt % of a water phase, more preferably, about 25 to 50 wt % of an oil phase and about 75 to 50 wt % of a water phase, and the ink can be produced by dropwise adding the water phase with stirring to the oil phase for emulsification.

In this invention, the oil phase contains liquid components including a resin, a solvent and a surfactant as well as a pigment.

The resin is added in order to improve wettability between the solvent and the pigment and keep the resin and the solvent well adsorbed by the pigment, thereby improving storage stability of the emulsion ink and preventing the system of ink from becoming out of balance even after the ink has been allowed to stand for a long time. It is also added for the purpose of improving fixability of the colorant in the ink onto paper or improving finish of prints. Examples of the resin include alkyd resins, phenol resins, maleic resin, petroleum resin, etc. Among them, an alkyd resin is especially preferable since it is highly effective for improving wettability to the pigment. The alkyd resin may be one which has been treated for eliminating low molecular components therefrom, for the purposes of improving stability of the emulsion and eliminating odor.

Examples of the solvent include petroleum solvents such as olefin hydrocarbons, liquid paraffin and aromatic hydrocarbons, vegetable fats such as coconut oil and palm oil, vegetable oils such as olive oil, castor oil and linseed oil, synthetic oils, etc. These solvents may be used singly or in combination of two or more. Addition amount of the solvent can be properly selected to ensure that viscosity of the oil phase is adjusted to a desired level. Today, in view of safety to be secured, it is desirable that the solvent is selected considering content of aromatic components and content of volatile components. Furthermore, the solvent should be selected, sufficiently considering solubility of the resin used, so as to attain a stable emulsion system that is low in dependence of viscosity on temperature and is less likely to cause separation of the solvent even if the ink is allowed to stand in a printing machine. Moreover, to enhance solubility of the resin, a dissolving aid can also be added.

Examples of the surfactant include anionic surfactants such as metallic soaps, sulfuric esterification salts of higher alcohols and sulfuric esterification salts of polyoxyethylene adducts, cationic surfactants such as primary to tertiary amine salts and quaternary ammonium salts, nonionic surfactants such as esters between polyhydric alcohols and fatty acids, nonionic surfactants such as polyoxyethylene ethers of fatty acids, polyoxyethylene ethers of higher alcohols, alkyl phenol polyoxyethylene ethers, sorbitan fatty acid esters, polyoxyethylene ethers of polyglycerol fatty acid esters, polyoxyethylene ether of castor oil, polyoxyethylene ether of polyoxy propylene and alkylolamides of fatty acids, and the like. These may be used singly or in combination of two or more. Addition amount of the surfactant can be decided considering molar concentration of the surfactant concerned, area of interfaces between the water phase and the oil phase, and, as the case may be, area of interfaces between the oil phase and solids such as pigments.

Examples of the pigment are colorants including organic pigments such as insoluble azo pigments, soluble azo pigments, phthalocyanine blue, dye rakes, isoindolinone, quinacridone, dioxazine violet and perinone-perylene, and inorganic pigments such as carbon black and titanium dioxide, as well as extender pigments such as terra abla, talc, clay, diatomaceous earth, calcium carbonate, barium sulfate, titanium oxide, alumina white, silica, kaolin, mica and aluminum hydroxide.

In addition, for example, a pigment dispersing agent, an antioxidant, and another auxiliary agent including a compound mainly containing a wax for adjusting flowability can be added to the oil phase of this invention to such an extent that formation and stability of the emulsion are not impaired.

In this invention, the water phase is composed of water, an oil-in-water (O/W) emulsion of resins, a water-soluble resin, a wetting agent, an electrolyte, an antioxidant, and the like.

Examples of the oil-in-water (O/W) emulsion of resins include emulsions of resins including polyvinyl acetate, ethylene-vinyl acetate copolymer, vinyl acetate-acrylic ester copolymers, polymethacrylic esters, polystyrene, styrene-acrylic ester copolymers, styrene-butadiene copolymer, vinylidene chloride-acrylic ester copolymers, polyvinyl chloride, vinyl chloride-vinyl acetate copolymer, polyurethane, and the like.

Examples of the water-soluble resin include polyvinyl alcohol, methyl cellulose, carboxymethyl cellulose, hydroxyethyl cellulose, polyvinyl pyrrolidone, polyethylene-polyvinyl alcohol copolymer, polyethylene oxide, polyvinyl ether, polyacrylamide, gum arabic, starches, water-soluble polyurethane, etc. Addition amount of these resins is preferably 1 to 20 wt %, more preferably 2 to 10 wt %, as solid content based on the total weight of the emulsion ink. If the amount is more than 20 wt %, it can happen that the ink forms a film at perforations of the stencil and inhibits passage of the ink in case where the ink is allowed to stand for a long time on a stencil.

Examples of the wetting agent include polyhydric alcohols such as ethylene glycol, sorbitol and glycerol, and polyethylene glycol.

EXAMPLES

This invention is described below more particularly in reference to examples, but is not limited thereto or thereby. In the following examples, "parts" means "parts by weight".

Example 1

A water-in-oil (W/O) emulsion ink was prepared in accordance with the formulation shown in Table 1. First, a colorant (copper phthalocyanine blue) and an alkyd resin were dispersed using a bead mill. To the dispersion, spindle oil, AF-5 Solvent (produced by Nippon Oil Co., Ltd.) and sorbitan monooleate were added, to obtain an oil phase.

Furthermore, a water phase obtained by adding ethylene glycol and magnesium sulfate to ion exchange water was gradually added to the oil phase, and the mixture was stirred for emulsification, to prepare a water-in-oil (W/O) emulsion ink for stencil printing.

Specific gravity of the liquid components (components other than the colorant) of the oil phase and specific gravity of the water phase were each measured using a pycnometer at 23° C. Furthermore, the true specific gravity of the colorant was measured according to immersion method using a specific gravity bottle.

Average particle size of the colorant was measured by diluting the oil phase containing the colorant with an organic solvent and using a laser diffraction type particle size distribution analyzer (SALD-2000A produced by Shimadzu Corp.).

Average particle size of the emulsion was obtained by photographing the emulsion particles using a scanning electron microscope (cryosystem, JSM-6301F produced by JEOL Ltd.), processing the image, and calculating.

To evaluate printing density, fixability and clogging, a stencil printing machine, RISOGRAPH (registered trade mark) GR377 (produced by RISO KAGAKU CORPORATION) was used for solid printing, and the obtained prints were evaluated according to the following methods. Printing paper used was neutral paper conditioned in an environment of 23° C. and 50%. The evaluation results are shown in Table 2.

Printing Density Evaluation Method

Tenth and $500^{th}$ prints were sampled, and printing density was measured at dried solid printing portions of the prints using a reflection type optical densitometer (RD914 produced by Macbeth Corp.). When no clogging occurred, printing was further continued till the $3000^{th}$ print, and the printing density of the print was measured.

Fixability Evaluation Method

On the solid printing portion of the $500^{th}$ print, a crockmeter was reciprocated five times 24 hours after printing, for sensory inspection of colorant abrasion. Poor fixability is indicated by x, and good fixability, ○.

Clogging Evaluation Method

Printing densities of 10th print and 500th print were visually evaluated. A case where the printing density of the 500th print was evidently lower is indicated by x, and a case where both the printing densities were equivalent, ○.

Examples 2–4 and Comparative Examples 1 through 3

Water-in-oil (W/O) emulsion inks for stencil printing were prepared as described for Example 1, except that the formulations listed in Table 1 were used.

Example 5 and Comparative Example 4

A water-in-oil (W/O) emulsion ink for stencil printing was prepared as described for Example 1, except that an extender pigment (calcium carbonate, specific gravity 2.57 (g/cm$^3$), average particle size 0.06 μm) was added when the colorant was dispersed.

These inks were evaluated as described for Example 1, and the results are shown in Table 2.

TABLE 1

|   |   |   |   | Example 1 | Example 2 | Example 3 | Example 4 | Example 5 |
|---|---|---|---|---|---|---|---|---|
| Oil phase | Solid component of oil phase | Colorant | Copper phthalocyanine blue | 8.5 | 8.5 | 8.5 |   | 5.5 |
|   |   |   | Dioxazine violet |   |   |   | 8.5 |   |
|   |   | Extender pigment | Calcium carbonate |   |   |   |   | 3 |
|   | Liquid component of oil phase | Resin | Alkyd resin | 10 | 10 | 10 | 10 | 10 |
|   |   | Solvent | Spindle oil | 17.5 | 10 | 6 | 10 | 2.5 |
|   |   |   | AF-5 | 10 | 7.5 | 3.5 | 7.5 | 3 |
|   |   | Surfactant | Sorbitan monooleate | 2 | 2 | 2 | 2 | 2 |

TABLE 1-continued

| Water phase | Water | Ion exchange water | 43.8 | 52.3 | 59 | 52.3 | 28.7 |
|---|---|---|---|---|---|---|---|
| | Organic solvent | Ethylene glycol | 7.5 | 8.9 | 10 | 8.9 | 4.9 |
| | | Glycerol | | | | | 39.9 |
| | Electrolyte | Magnesium sulfate | 0.7 | 0.8 | 1 | 0.8 | 0.5 |

| | | | | Comparative Example 1 | Comparative Example 2 | Comparative Example 3 | Comparative Example 4 |
|---|---|---|---|---|---|---|---|
| Oil phase | Solid component of oil phase | Colorant | Copper phthalocyanine blue | 8.5 | 8.5 | | 8.5 |
| | | | Dioxazine violet | | | 8.5 | |
| | | Extender pigment | Calcium carbonate | | | | 3 |
| | Liquid component of oil phase | Resin | Alkyd resin | 10 | 10 | 10 | 10 |
| | | Solvent | Spindle oil | 2.5 | 1 | 2.5 | 2 |
| | | | AF-5 | 3 | 1.5 | 3 | 2.5 |
| | | Surfactant | Sorbitan monooleate | 2 | 2 | 2 | 2 |
| Water phase | Water | Ion exchange water | | 62.4 | 64.9 | 62.4 | 60.7 |
| | Organic solvent | Ethylene glycol | | 10.6 | 11 | 10.6 | 10.3 |
| | | Glycerol | | | | | |
| | Electrolyte | Magnesium sulfate | | 1 | 1.1 | 1 | 1 |

TABLE 2

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Colorant | Specific gravity (g/cm$^3$) | 1.74 | 1.74 | 1.74 | 1.43 | 1.74 | 1.74 | 1.74 | 1.43 | 1.74 |
| | Volume (cm$^3$) | 4.89 | 4.89 | 4.89 | 5.94 | 3.16 | 4.89 | 4.89 | 5.94 | 4.89 |
| | Average particle size ($\mu$m) | 1.24 | 1.24 | 1.24 | 1.35 | 1.24 | 1.24 | 1.24 | 1.35 | 1.24 |
| Extender pigment | Specific gravity (g/cm$^3$) | | | | | 2.57 | | | | 2.57 |
| | Volume (cm$^3$) | | | | | 1.17 | | | | 1.17 |
| | Average particle size ($\mu$m) | | | | | 0.06 | | | | 0.06 |
| Volume ratio of pigments to oil phase | | 0.1 | 0.13 | 0.17 | 0.15 | 0.18 | 0.20 | 0.24 | 0.24 | 0.25 |
| Liquid component of oil phase | Specific gravity (g/cm$^3$) | 0.89 | 0.9 | 0.9 | 0.9 | 0.91 | 0.91 | 0.93 | 0.91 | 0.9 |
| | Volume (cm$^3$) | 44.4 | 32.8 | 23.9 | 32.8 | 19.2 | 19.2 | 15.6 | 19.2 | 18.3 |
| Water phase | Specific gravity (g/cm$^3$) | 1.03 | 1.03 | 1.03 | 1.03 | 1.13 | 1.03 | 1.03 | 1.03 | 1.03 |
| | Volume (cm$^3$) | 48.5 | 60.2 | 68 | 60.2 | 65.5 | 71.8 | 74.8 | 71.8 | 69.9 |
| Average particle size of emulsion ($\mu$m) | | 0.3 | 0.3 | 0.3 | 0.3 | 0.3 | 0.3 | 0.3 | 0.3 | 0.3 |
| Weight ratio (water phase/oil phase) | | 1.08 | 1.63 | 2.33 | 1.63 | 2.85 | 2.85 | 3.35 | 2.85 | 2.57 |
| Weight ratio (water phase/liquid component of oil phase) | | 1.31 | 2.1 | 3.26 | 2.1 | 4.23 | 4.23 | 5.31 | 4.23 | 4.36 |
| Volume ratio (water phase/liquid component of oil phase) | | 1.09 | 1.84 | 2.85 | 1.84 | 3.41 | 3.74 | 4.8 | 3.74 | 3.82 |
| Fixability | | ○ | ○ | ○ | ○ | ○ | X | X | X | X |
| Clogging | | ○ | ○ | ○ | ○ | ○ | X | X | X | X |
| Printing density | 10$^{th}$ print | 1.2 | 1.23 | 1.18 | 0.92 | 1.17 | 1.18 | 1.23 | 0.84 | 1.1 |
| | 500$^{th}$ print | 1.19 | 1.22 | 1.18 | 0.91 | 1.15 | 0.89 | 0.91 | 0.56 | 0.89 |
| | 3000$^{th}$ print | 1.19 | 1.23 | 1.16 | 0.9 | 1.12 | — | — | — | — |

According to this invention, since the ratio by volume of the water phase to the liquid components of the oil phase (i.e., volume of water phase/volume of the liquid components of oil phase) is used as an indicator and kept at 1.0 to 3.5, preferably 1.0 to 3.0 at 23° C., aggregation of pigments, particularly aggregation of organic pigments with non-uniform shapes and a large average particle size such as copper phthalocyanine blue or dioxazine violet can be prevented, and a water-in-oil (W/O) emulsion ink for stencil printing good in printing density and fixability and not causing clogging can be obtained.

What is claimed is:

1. A water-in-oil (W/O) emulsion ink for stencil printing, having an oil phase and a water phase, which has a ratio by volume of the water phase to liquid components of the oil phase in a range of 1.0 to 3.5 at 23° C., in which said oil phase contains a pigment.

2. An emulsion ink for stencil printing, according to claim 1, in which said ratio is in a range of 1.0 to 3.0 at 23° C.

3. An emulsion ink for stencil printing, according to claim 1, in which said liquid components of the oil phase are composed of a resin, a solvent and a surfactant.

4. An emulsion ink for stencil printing, according to claim 1, in which the pigment content in said oil phase is 0.19 or less as a ratio by volume to the total volume of the oil phase.

5. A water-in-oil (W/O) emulsion ink for stencil printing, having an oil phase and a water phase, which has a ratio by volume of the water phase to liquid components of the oil phase in a range of 1.0 to 3.5 at 23° C., wherein said oil phase contains a pigment in addition to said liquid components, said pigment content in said oil phase is 0.19 or less as a ratio of volume to the total volume of said oil phase, and said pigment has an average particle size of 0.02 to 1.5 μm.

6. An emulsion ink for stencil printing, according to claim 1, in which said water phase has an average particle size of 0.1 to 1.0 (μm).

7. An emulsion ink for stencil printing according to claim 5, wherein said ratio by volume of the water phase to liquid components in the oil phase is in a range of 1.0 to 3.0 at 23° C.

8. An emulsion ink for stencil printing according to claim 5, wherein said liquid components of said oil phase comprise a resin, a solvent and a surfactant.

9. An emulsion ink for stencil printing according to claim 5, wherein said emulsion said water phase has an average particle size of 0.1 to 1.0 μm.

* * * * *